(12) United States Patent
Wen

(10) Patent No.: US 7,717,695 B2
(45) Date of Patent: May 18, 2010

(54) FILM PROFILE FORMING DEVICE

(75) Inventor: Yi Wen, Chongqing (CN)

(73) Assignee: Profile-Tech International Co., Ltd., Hong Kong (CN)

( * ) Notice: Subject to any disclaimer, the term of this patent is extended or adjusted under 35 U.S.C. 154(b) by 56 days.

(21) Appl. No.: 11/953,840

(22) Filed: Dec. 10, 2007

(65) Prior Publication Data

US 2009/0123593 A1    May 14, 2009

(30) Foreign Application Priority Data

Nov. 12, 2007    (TW) ............... 96219080 U

(51) Int. Cl.
*B28B 3/00* (2006.01)
(52) U.S. Cl. ................. 425/394; 425/395; 425/398
(58) Field of Classification Search ................. 425/394, 425/398, 407, 395, 384
See application file for complete search history.

(56) References Cited

U.S. PATENT DOCUMENTS

| | | | | |
|---|---|---|---|---|
| 5,814,185 A | * | 9/1998 | Chun et al. | 425/394 |
| 7,314,360 B2 | * | 1/2008 | Koda et al. | 425/3 |
| 7,399,175 B2 | * | 7/2008 | Arends | 425/395 |
| 7,435,075 B2 | * | 10/2008 | Peng et al. | 425/394 |
| 2007/0087072 A1 | | 4/2007 | Peng et al. | |

* cited by examiner

*Primary Examiner*—Richard Crispino
*Assistant Examiner*—Thu Khanh T Nguyen
(74) *Attorney, Agent, or Firm*—Chun-Ming Shih

(57) ABSTRACT

A film profile forming device includes a supporting table, a screw coupled to the supporting table in a perpendicular direction, a motor arranged on an end of the screw for rotating the screw, a guiding base having a screw hole engaged with the screw being driven by the screw for dispersing force and moving in the perpendicular direction, a lower base fixed under the supporting table, and a upper base glidingly arranged between the supporting table and the lower base. The upper base is brought by the guiding base and moves to and fro in the perpendicular direction to close or away from the lower base.

3 Claims, 4 Drawing Sheets

FILM PROFILE FORMING DEVICE

FIELD OF THE INVENTION

The present invention relates to a film thermoforming device, and more specifically, to a transmitting technology relating to a thermoforming device for a film by in-mold labeling.

DESCRIPTION OF THE RELATED ART

For labeling on plastic products, conventionally, it prints or sprays figures or words on the surfaces of the plastic products after the plastic products are formed. However, there are many disadvantages. For example, the figures or words are prone to be damaged by frequent contact since they are formed on the surfaces of the products. Furthermore, it needs more time to complete.

Another in-mold labeling (IML) method is well known as an advanced method for labeling the figures or words. A planar transparent plastic film material is prepared to form a three-dimensional transparent film, which is configured for combining with the plastic products. The three-dimensional transparent film has the figures or words formed thereon. The three-dimensional transparent film is arranged in a mould, and hot plastic is injected into the mould to integrate the three-dimensional transparent film with the plastic product. Therefore, the technology can protect and display the figures or words through the three-dimensional transparent film.

The key step of the technology of in-mold labeling is performing the planar transparent film material to obtain the three-dimensional transparent film. The key step may be achieved by a technology of matched metal forming, such as a thermoforming machine disclosed in a US Pat. Pub. No. 2007/0087072. The thermoforming machine employs a servo motor to drive a nut rotating through a strap. A screw and an upper plate, a supporting plate, a male die formed thereon, are indirectly driven to move to and fro in a perpendicular direction, such that the male die moves to and fro in a direction to close or far away a female die for thermoforming the planar transparent film material arranged on the top of the female die to mold the three-dimensional transparent film. However, the thickness of the film is very small (approximately 0.2 mm). When the strap indirectly drives the screw to move the male die, a width for transmitting the strap is not good for the precision for moving the male die, such that the precision of the molded film will not be easy to control. Furthermore, since the screw is movable, and the screw relates directly to the squeezing die by a punch set and the displacement of splitting module, especially, the force relating to the squeezing die is conducted and distributed around the male die, the precision of the molded film is also not easy to control.

What is needed is a thermoforming device for a film, which can solve the above problems.

BRIEF SUMMARY

An object of the present invention is providing a thermoforming device for a film, which employs a motor to drive a screw, for improving the moving precision of the screw driven by the strap in the prior art, and improving the moving precision of the male die, and the quality of the film produced.

Another object of the present invention is providing a rotating screw, which conducts and disperses uniformly force to the upper base and the male die through a guiding base, to improve the stability of the male die, disperse sufficiently the force, and improve the precision of the produced film.

A thermoforming device for a film in accordance with a preferred embodiment of the present invention, includes:
a supporting table;
a screw coupled to the supporting table in a perpendicular direction;
a motor arranged on an end of the screw for rotating the screw;
a guiding base having a screw hole engaged with the screw driven by the screw for dispersing force and moving in the perpendicular direction;
a lower base fixed under the supporting table; and
an upper base glidingly arranged between the supporting table and the lower base, the upper base being brought by the guiding base and moving to and fro in the perpendicular direction to close or far away the lower base.

Preferably, a male die having a heating capability is mounted on the bottom of the upper base. A female die having a heating capability is mounted on the top of the lower base. A flat plastic thin material is arranged on the female die. The male die is brought by the upper base to move to the female die, for hot-pressing the flat thin material and forming a predetermined film. The film may be transparent and non-transparent.

Preferably, the motor is arranged on an axis of one of a top or a bottom of the screw. A plurality of guiding poles is arranged between the supporting table and the lower base, and a plurality of through holes is arranged in the periphery of the upper base to correspond to the guiding poles, such that the upper base is glidingly arranged between the supporting table and the lower base.

A frame is arranged above the supporting table. The screw is arranged between the frame and the supporting table, the motor is arranged on the frame, and has a rotating axis to combine with the screw for rotating the screw.

The supporting table has a plurality of through holes arranged thereon. A plurality of guiding columns are arranged between the guiding base and the upper base to correspond to the through hole for moving the upper base brought by the guiding base.

A cooler is arranged on a bottom of the lower base. The motor is a servo motor.

Other objects, advantages and novel features of the invention will become more apparent from the following detailed description when taken in conjunction with the accompanying drawings, in which:

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe a preferred embodiment of the present thermoforming device, in detail.

Figure 1:
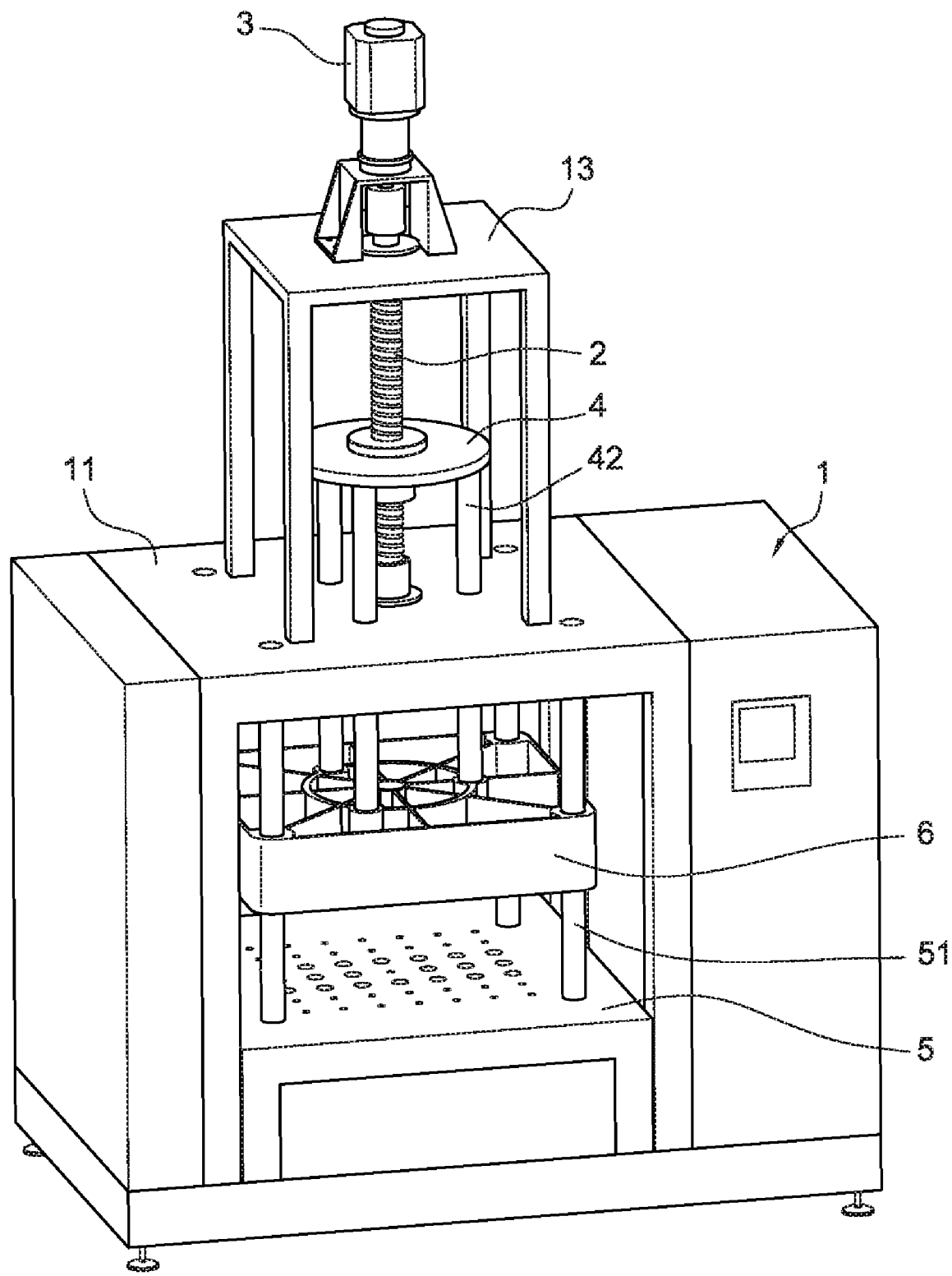
FIG. 1 is a schematic, exploded view of a thermoforming device for a film in according to a preferred embodiment of the present invention.
Figure 2:
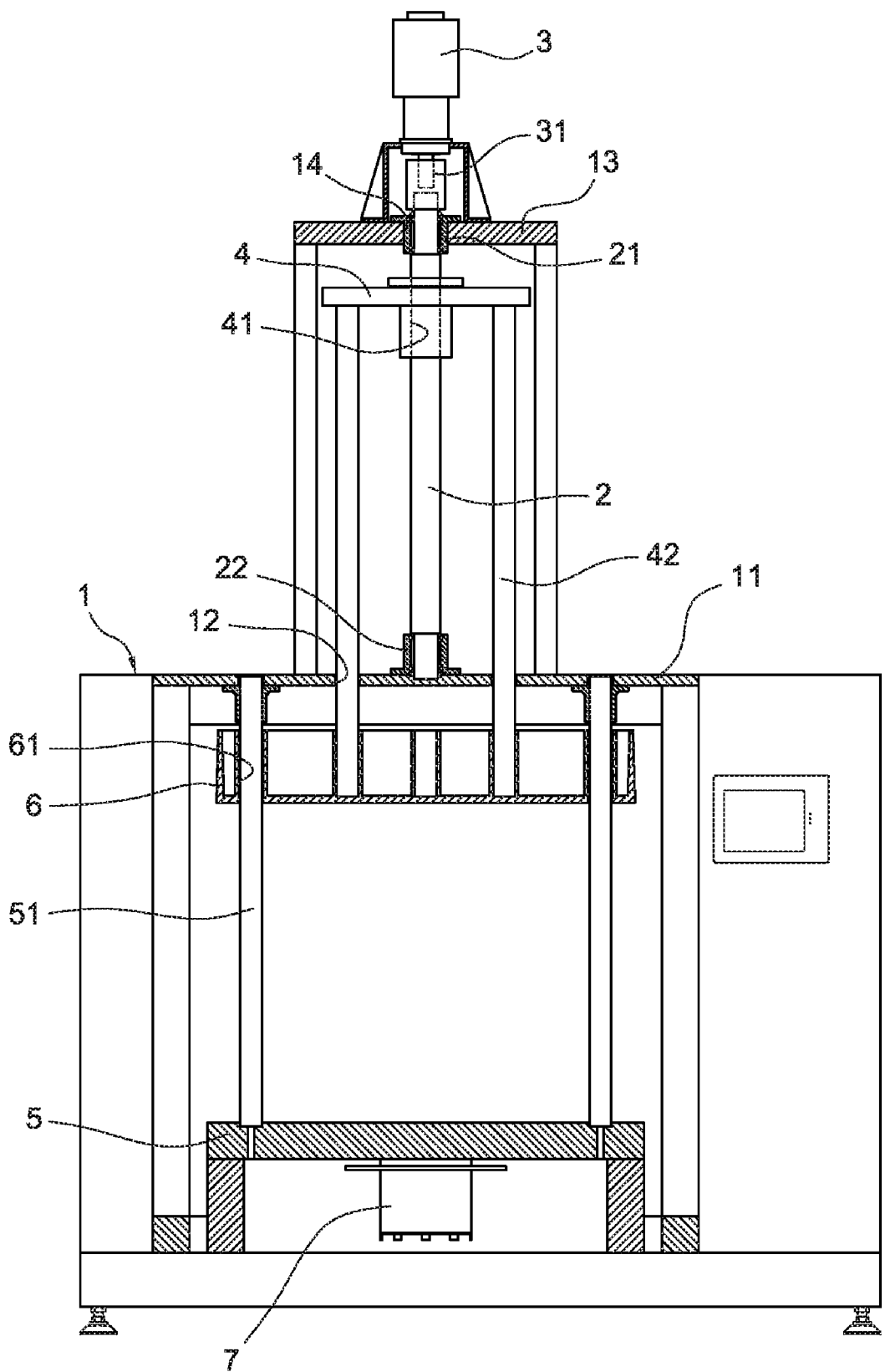
FIG. 2 is a schematic, front view of the device as shown in FIG. 1.
Figure 3:
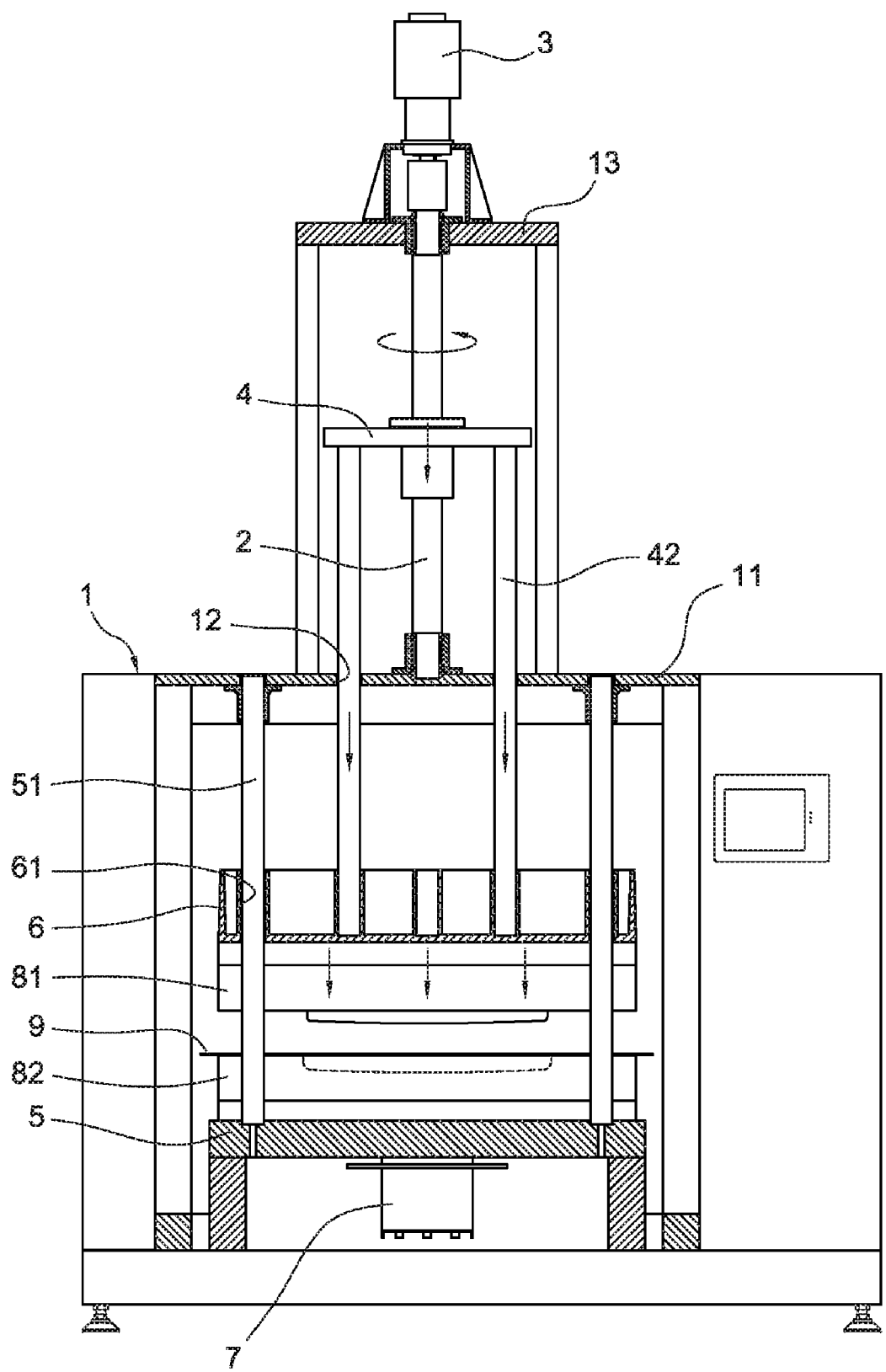
FIG. 3 is a schematic, view of the device in use as shown in FIG. 2.
Figure 4:
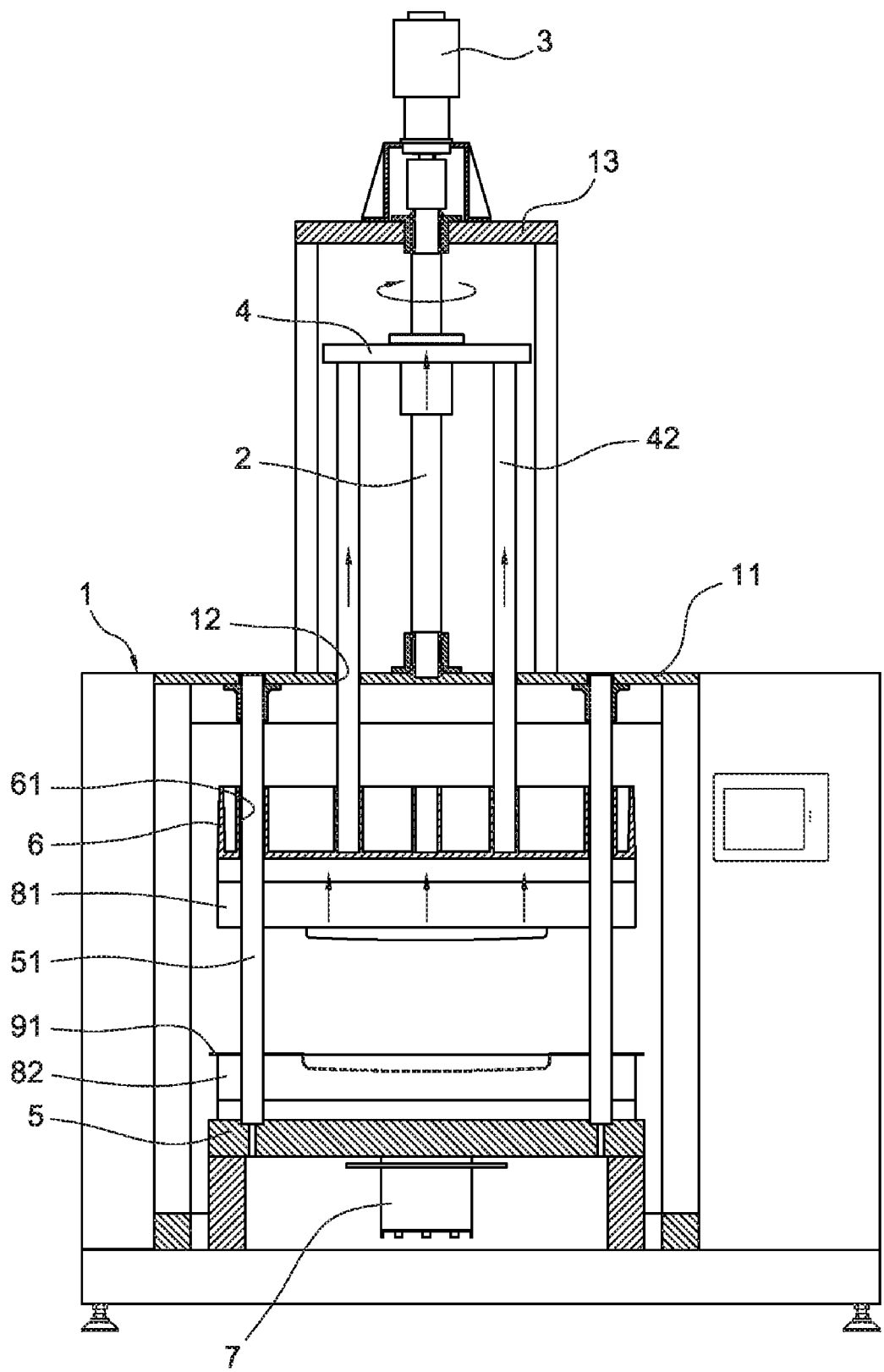
FIG. 4 is another schematic, view of the device in use as shown in FIG. 2.

Referring to FIG. 1, a schematic, exploded view of a thermoforming device for a film in accordance with a preferred embodiment of the present invention is shown. Referring to FIG. 2 together, the present thermoforming device includes:
a supporting table 11;

a screw 2 coupled on a top of the supporting table 11 perpendicularly;

a servo motor 3, arranged at an end of the screw 2 for rotating the screw 2 (as shown in FIG. 3 together);

a circle-shaped guiding base 4 having a central screw hole 41, the circle-shaped guiding base 4 being engaged with the screw 2 to be driven by the screw 2 for dispersing force and moving in a perpendicular direction (as shown in FIGS. 3 and 4);

a rectangular flat lower base 5 fixed under the supporting table 11; and a rectangular flat upper base 6 glidingly arranged between the supporting table 11 and the lower base 5, the rectangular flat upper base 6 being brought by the guiding base 4, which dispersing force produced by the screw 2, such that the upper base 6 moving to and fro in a perpendicular direction to close or far away the lower base 5 (as shown in FIGS. 3 and 4).

The lower base 5 and the upper base 6 are arranged in a shell 1 (as shown in FIGS. 1 and 2). The supporting table 11 is formed on the top of the shell 1. A plurality of guiding poles 51 are arranged between the periphery of the supporting table 1 and the periphery of the lower base 5. A plurality of through holes 61 are arranged in the periphery of the upper base 6 for corresponding to the plurality of guiding poles 51, such that the upper base 6 is glidingly arranged between the supporting table 11 and the lower base 5.

A frame 13 is arranged above the supporting table 11 (as shown in FIGS. 1 and 2). The frame 13 has a central axis hole 14, and an axis sleeve 21 is arranged in the axis hole 14. Another axis sleeve 22 is arranged on the top of the supporting table 11. The axis sleeve 21 is opposite to the axis sleeve 22. The screw 2 is coupled between the axis sleeve 21 of the frame 13 and the axis sleeve 22 of the supporting table 11, and the screw 2 inserts through the axis sleeve 21 and extends to the top of the frame 13. The servo motor 3 is arranged on the top of the frame 3, and has a rotating axis 31 combined with the screw 2 to rotate directly the screw 2.

A plurality of through holes 12 (as shown in FIGS. 1 and 2) are arranged in the supporting table 11. A plurality of guiding columns 42 are arranged between the guiding base 4 and the upper base 6. The guiding columns 42 slip relating to the through holes 12. The upper base 6 moves since the guiding columns 42 transmit the force of the screw 2 dispersed by the guiding base 4. A cooler 7 is arranged on the bottom of the lower base 5 to cool the lower base 5.

A male die 81 (as shown in FIG. 3) having a heating capability, is mounted on the bottom of the upper base 6. A female die 82 having a heating capability, is mounted on the top of the lower base 5. A flat plastic thin material 9 is arranged on the female die 82. The motor 3 is driven to rotate the screw 2 for making the guiding base 4, guiding columns 42, upper base 6 and male die 81 moving to the female die 82 of the top of the lower base 5, such that the flat thin material is hot-pressed to form a predetermined thin product 91 (as shown in FIG. 4). Then, the cooler 7 is used to cool the lower base 5 and the thin product 91. The motor 3 is controlled to make the screw 2 rotating in a direction far away the female die, such that the guiding base 4, the guiding columns 42, upper base 6 and the male die 81 move to and fro in the direction far away the female die 82.

The present invention employs the motor 3 to rotate directly the screw 2, such that the precision of the male die 81 is improved. The screw 2 conducts and disperses uniformly the force to the upper base 6 and the male die 81 through the guiding base 4, and moves the male die 81 in the perpendicular direction, such that the stability of the male die 81 is improved and the force are dispersed sufficiently, such that the present invention is adapt to the hot-press precision of the film having a thickness about 0.2 mm.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A thermoforming device for a film, comprising:

a shell having a supporting table formed on top thereof, a first axis sleeve being arranged on outer surface of the supporting table;

a frame arranged above the supporting table, having a central axis hole formed on the top thereof, and a second axis sleeve being arranged in the axis hole;

a screw arranged in the frame and coupled between the first axis sleeve and the second axis sleeve in a perpendicular direction, the screw inserting through the second axis sleeve and extending out of the frame;

a motor arranged above the frame, and having a rotating axis to combine with the screw for directly rotating the screw;

a guiding base having a screw hole engaged with the screw be driven by the screw for dispersing force and moving in the perpendicular direction;

a lower base arranged in the shell and fixed under the supporting table;

a upper base arranged in the shell and glidingly arranged between the supporting table and the lower base, the upper base being brought by the guiding base and moving to and fro in the perpendicular direction to close or far away the lower base;

a plurality of guiding poles arranged between the supporting table and the lower base, and a plurality of through holes arranged in the periphery of the upper base to correspond to the guiding poles, such that the upper base being glidingly arranged between the supporting table and the lower base;

a plurality of guiding columns passed through the supporting table and arranged between the guiding base and the upper base for moving the upper base brought by the guiding base;

a male die having heating capability, mounted on bottom of the upper base;

a female die having heating capability, mounted on top of the lower base; and a flat plastic thin material arranged on the female die, whereby the motor is driven to rotate the screw for making the guiding base, the guiding columns, the upper base and male die moving to the female die, such that the flat thin material is hot-pressed to form a predetermined thin film product.

2. The device as claimed in claim 1, further comprising a cooler arranged on a bottom of the lower base.

3. The device as claimed in claim 1, wherein the motor is a servo motor.

* * * * *